3,642,814
SUBSTITUTED TETRAZOLOISOINDOLES
William J. Houlihan, Mountain Lakes, and Marcel K. Eberle, Madison, N.J., assignors to Sandoz-Wander, Inc., Hanover, N.J.
No Drawing. Filed Feb. 6, 1969, Ser. No. 797,285
Int. Cl. C07d 57/26, 99/02
U.S. Cl. 260—308 D          8 Claims

ABSTRACT OF THE DISCLOSURE

Substituted tetrazoloisoindoles, e.g., 5-(p-chlorophenyl)-5-methyl-5H-tetrazolo[5,1-a]isoindoles, are useful as CNS depressants.

---

This invention relates to tetrazoloisoindoles. More particularly, it relates to substituted tetrazoloisoindoles, intermediates therefor, and to processes for their preparation.

The compounds of this invention may be represented by the formula:

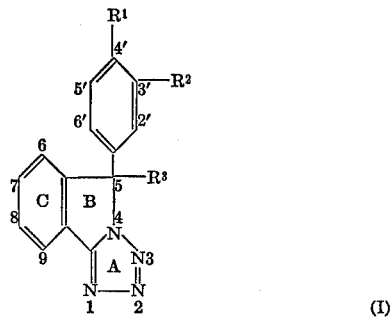

(I)

wherein:

$R^1$ and $R^2$ are each, independently, H, chloro or alkoxy having 1 to 3 carbon atoms, e.g., methoxy, ethoxy, propoxy, and $R^3$ is lower ankyl, i.e., alkyl having 1 to 3 carbon atoms (methyl, ethyl, propyl, isopropyl), benzyl, allyl or propynyl.

The process for preparing the compounds of Formula I may be represented as follows:

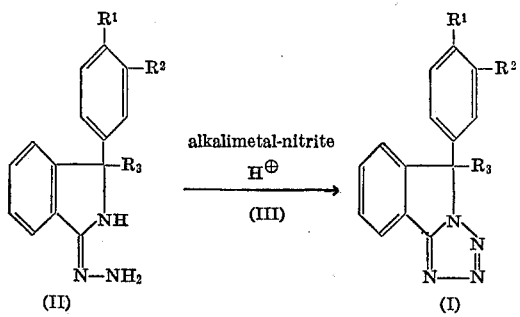

wherein $R^1$, $R^2$ and $R^3$ have the above-stated significance.

Compound (I) is prepared by treating compound (II) with alkali metal-nitrile (III), i.e., sodium nitrite, potassium nitrite or lithium nitrite in the presence of an acid. Among the acids which may be used are acetic, hydrochloric, sulfuric and phosphoric acids. Hydrochloric acid is preferred. The reaction temperature may be from about −10° to 30° C., preferably 0° to 20° C. The reaction time may be from about 1 to 4 hours, preferably 1 to 2 hours. Neither the reaction time nor temperature are critical.

The process for preparing the compounds of Formula II may be represented as follows:

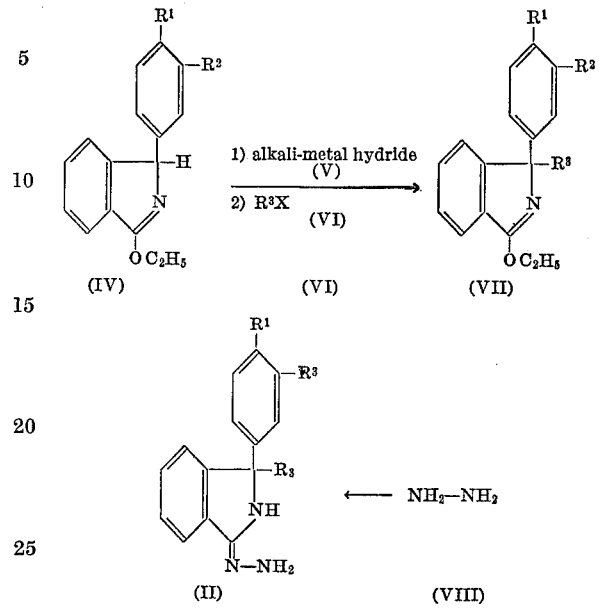

wherein $R^1$, $R^2$ and $R^3$ have the above-stated significance, and X is halo having an atomic weight of 35 to 127.

The compounds of Formula VII are prepared by treating (in the presence of an inert gas) an isoindole (IV) first with an alkali-metal hydride (V), i.e., sodium hydride and then with $R^3X$ (VI) (where $R^3$ and X have the above-stated significance), e.g., methyliodide. The reactions are carried out in a solvent such as dimethylformamide, dimethylacetamide, a mixture of dimethylformamide and dimethylacetamide, toluene or xylene at a temperature of from 10 to 100° C. (preferably 40 to 60° C.) for about 2 to 24 hours (preferably 8 to 12 hours). The inert gas may be nitrogen, helium, argon, and the like. The resulting compound (VII) is treated with hydrazine (VIII) in a solvent at a temperature of from 50° to 150° C. (preferably 70° to 100° C.), for about 2 to 72 hours (preferably 2 to 48 hours when $R^3$ is lower alkyl, allyl or propynyl and 2 to 4 hours when $R^3$ is benzyl) to give the compounds of Formula II. The solvent may be lower alkanols, such as methanol, ethanol or isopropanol, inert hydrocarbons such as toluene or ethers such as tetrahydrofuran. Neither the solvents nor the temperatures used are critical.

The compounds of Formula II may also be illustrated by their tautomeric equivalents as represented by the following structural formula:

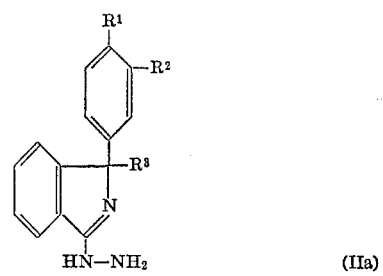

(IIa)

In order to simplify this description, however, Formula II only will be used. It should be nevertheless understood that the compounds of Formula IIa may be represented as well as the compounds of Formula II and both tautomeric forms are within the concept of the present invention.

The compounds of Formula II may be prepared in acid addition salt form such as the hydrochloride by conventional methods such as suspending the compound (II), in alcohol or water and treating with the appropriate acid.

The isoindoles (IV) are prepared from corresponding phthalimidines (IX) of the formula:

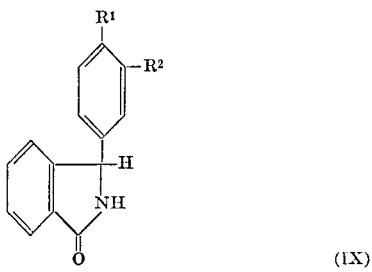

(IX)

where $R^1$ and $R^2$ are as defined above, by treatment with triethyloxonium boron-tetrafluoride in solvent such as chlorinated hydrocarbons, e.g., methylene chloride, conveniently at about room temperature for about 2–16 hours. The isoindoles (II) are then recovered using conventional techniques such as crystallization.

Certain of the starting compounds (IX) are known and they are readily prepared according to methods disclosed in the literature. Those phthalimidines (IX) which are not known may be prepared by analogous methods from known materials.

The compounds represented by Formulas I and II are useful because they possess pharmacological properties in animals. In particular, these compounds are useful as CNS depressants as indicated by their activity in mice given 200 mg./kg. of active agent and tested according to the 30-word adjective check sheet system basically described by Irwin S. (Gorden Research Conference, Medicinal Chemistry, 1959) and Cen (Symposium on Sedative and Hypnotic Drugs, Williams and Wilkins, 1954). The compounds of Formulas I and II may be combined with a pharmaceutically acceptable carrier or adjuvant. They may be administered orally or parenterally. The dosage will depend upon the mode of administration utilized and the particular compound employed.

In general, satisfactory results are obtained when the compounds are administered at a daily dose of from about 10 to 40 mg./kg. of animal body weight. This daily dosage is preferably given in divided doses, e.g., 2 to 4 times a day or in sustained release form. For most large animals, total daily dosage is from about 400 mg. to 2 g. Dosage forms suitable for internal administration comprise from about 100 mg. to 1 g. of the compound in admixture with a solid or liquid pharmaceutical carrier or diluent.

A representative formulation suitable for oral administration is a tablet prepared by standard tabletting techniques which contains the following.

| Ingredient: | Parts by wt. |
|---|---|
| 5 - (p-chlorophenyl) - 5-methyl-5H-tetrazolo[5,1-a] isoindole | 50 |
| Tragacanth | 2 |
| Lactose | 39.5 |
| Corn starch | 5 |
| Talcum | 3 |
| Magnesium stearate | 0.5 |

The compounds 5 - (p-chlorophenyl) - 5-methyl-5H-tetrazolo[5,1-a]isoindole and 3-(p-chlorophenyl)-3-methylisoindolin-1-one hydrazone are useful as anti-convulsants as indicated by their activity in mice given 40–100 mg./kg. of active agent and tested against chemically induced and electrically induced convulsions, basically as described by Orloff et al. (Proc. Soc. Exp. Biol., 70: 254, 1949) (chemically) and Toman, et al. (J. Neurophysiol., 9: 231, 1946) (electrically). The compounds may be combined with a pharmaceutically acceptable carrier or adjuvant. They may be administered orally or parenterally. The dosage will depend upon the mode of administration utilized and the particular compound employed.

In general, satisfactory results are obtained when these two compounds are administered at a daily dose of from 10 to 250 mg./kg. of animal body weight. This daily dosage is preferably given in divided doses, e.g., 2 to 4 times a day or in sustained release form. For most large animals, total daily dosage is from about 600 mg. to 1600 mg. Dosage forms suitable for internal administration comprise from about 150 to 800 mg. of the compound in admixture with a solid or liquid pharmaceutical carrier or diluent.

The invention is illustrated but not limited by the following examples.

EXAMPLE 1.—5-(p-CHOROPHENYL)-5-METHYL-5H-TETRAZOLO[5,1-a]ISOINDOLE

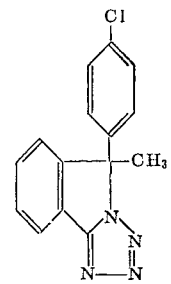

Step 1: 1-(p-chlorophenyl)-3-ethoxy-1-methyl-1H-isoindole

Under an atmosphere of nitrogen, 10 g. of a 60% sodium hydride dispersion in mineral oil is placed in a three liter flask. The dispersion is washed three times with anhydrous ether to remove the mineral oil and 100 ml. of absolute dimethylformamide is added. Under vigorous stirring, a solution of 54 g. of 1 - (p-chlorophenyl)-3-ethoxy-1H-isoindole in 500 ml. of absolute dimethylformamide is added dropwise and the stirring is continued for 2 hours at room temperature. Methyliodide (36 g.) is added dropwise, the temperature rising to 50° C. Agitation is continued overnight. The solvent is removed under reduced pressure and the residue extracted with methylenechloride and washed with water. The organic layer is evaporated and the crude product (54 g.) is dissolved in ethanol (200 ml.) and precipitated by addition of water, to yield 47 g. (83%) of 1 - (p-chlorophenyl)-3-ethoxy-1-methyl-1H-isoindole, M.P. 95–97° C.

Step 2: 3-(p-chlorophenyl)-3-methylisoindolin-1-one hydrazone

A mixture of 20 g. of 1-(p-chlorophenyl)-3-ethoxy-1-methyl-1H-isoindole and 6.7 g. of hydrazine in 250 ml. of absolute ethanol is refluxed overnight. Then the product, 3-(p-chlorophenyl)-3-methylisoindolin-1-one hydrazone is precipitated by adding water (100 ml.), yield 18.2 g. (95%); M.P. higher than 340° C.

Step 3: 5-(p-chlorophenyl)-5-methyl-5H-tetrazolo[5,1-a]isoindole 3-(p-chlorophenyl) - 3 - methylisoindolin-1-one hydrazone (9 g.) is dissolved in 250 ml. of 2 N hydrochloric acid and chilled in ice. Then an aqueous solution of 5 g. sodium nitrite is added dropwise. After one hour at room temperature, the product is extracted with methylenechloride. The crude product obtained after evaporation of the solvent is recrystallized from ethanol/water to yield 5.35 g. of 5-(p-chlorophenyl)-5-methyl-5H-tetrazolo[5,1-a]isoiindole, M.P. 113–116° C.

EXAMPLE 2.—5-BENZYL-5(p-CHLOROPHENYL)-5H-TETRAZOLO[5,1-a]ISOINDOLE

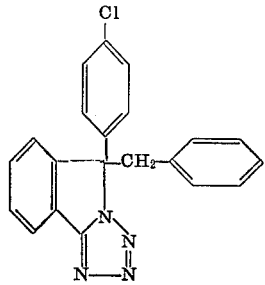

Step 1: 1-benzyl-1-(p-chlorophenyl)-3-ethoxy-1H-isoindole

Under an atmosphere of nitrogen, 4.4 g. of a 60% sodium hydride dispersion in mineral oil is placed in a three liter flask. The dispersion is washed three times with anhydrous ether to remove the mineral oil and 100 ml. of absolute dimethylformamide is added. Under vigorous stirring a solution of 21.6 g. of 1-(p-chlorophenyl)-3-ethoxy-1H-isoindole in 250 ml. of absolute dimethylformamide is added dropwise and stirring is continued for 2 hous at room temperature. Benzylchloride (14 g.) is added dropwise. Agitation is continued for 3 days. The solvent is removed under reduced pressure and the residue extracted with methylenechloride and washed with water. The organic layer is evaporated and the crude product (37 g.) is dissolved in ethanol (50 ml.) and precipitated by addition of water, to yield 18 g. (62%) of 1-benzyl-1-(p-chlorophenyl) - 3 - ethoxy-1H-isoindole, M.P. 127–128° C.

Step 2: 3-benzyl-3-(p-chlorophenyl)isoindolin-1-one hydrazone

A mixture of 10 g. of 1-benzyl-1-(p-chlorophenyl)-3-ethoxy-1H-isoindole and 6 g. of hydrazine in 250 ml. of absolute ethanol is refluxed for 3 days. Then the product, 3-benzyl-3-(p-chlorophenyl)-isoindolin-1-one hydrazone, is precipitated by adding water, yield 8.4 g. (88%); M.P. 159–161° C.

Step 3: 5-benzyl-5-(p-chlorophenyl)-5H-tetrazolo[5,1-a]isoindole 3-benzyl-3-(p-chlorophenyl) - isoindolin-1-one hydrazone (3.2 g.) is dissolved in 100 ml. of 2 N hydrochloric acid and chilled in ice. Then an aqueous solution of 2 g. sodium nitrite is added dropwise. After two hours at room temperature the product which precipitated is filtered off, washed with water and recrystallized from ethanol to yield 2.5 g. (76%) of 5-benzyl-5-(p-chlorophenyl)-5H-tetrazolo[5,1-a]isoindole; M.P. 212–214° C.

EXAMPLE 3.—5-BENZYL-5-(3,4-DICHLOROPHENYL)-5H-TETRAZOLO[5,1-a]ISOINDOLE

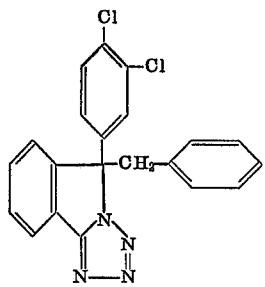

Step 1: 1-benzyl-1-(3,4-dichlorophenyl)-3-ethoxy-1H-isoindole

Under an atmosphere of nitrogen, 4.6 g. of a 60% sodium hydride dispersion in mineral oil is placed in a three liter flask. The dispersion is washed three times with anhydrous ether to remove the mineral oil and 100 ml. of absolute dimethylformamide is added. Under vigorous stirring a solution of 30 g. of 1-(3,4-dichlorophenyl)-3-ethoxy-1H-isoindole in 500 ml. of absolute dimethylformamide is added dropwise and stirring is continued for 2 hours at room temperature. Benzylchloride (12.7 g.) is added dropwise, the temperature rising to 40° C. Agitation is continued overnight. The solvent is removed under reduced pressure and the residue extracted with ether and washed with water. The organic layer is evaporated and the crude product is dissolved in ethanol and precipitated by addition of water, to yield 33 g. (85%) of 1-benzyl-1-(3,4-dichlorophenyl) - 3 - ethoxy-1H-isoindole, M.P. 79–81° C.

Step 2: 3-benzyl-3-(3,4-dichlorophenyl)-isoindolin-1-one hydrazone

A mixture of 5 g. of 1-benzyl-1-(3,4-dichlorophenyl)-3-ethoxy-1H-isoindole and 6.3 g. of hydrazine in 60 ml. of absolute ethanol is refluxed for 5 days. Then the product, 3-benzyl-3-(3,4-dichlorophenyl)isoindolin-1-one hydrazone, is extracted with methylenechloride, concentrated under reduced pressure and precipitated by adding hexane; yield 4 g. (83%); M.P. 119–121° C.

Step 3: 5-benzyl-5-(3,4-dichlorophenyl)-5H-tetrazolo[5,1-a]isoindole 3-benzyl-3-(3,4-dichlorophenyl) - isoindolin - 1 - one hydrazone (2 g.) is suspended in 100 ml. of 2 N hydrochloric acid and chilled in ice. Then an aqueous solution of 2.2 g. of sodium nitrite is added dropwise. After one hour at room temperature the product is extracted with methylenechloride. The crude product obtained after evaporation of the solvent is recrystallized from ethanol/water to yield 1.9 (65%) of 5-benzyl-5-(3,4-dichlorophenyl)-5H-tetrazolo[5,1-a]isoindole; M.P. 187–189° C.

EXAMPLE 4.—5 - ALLYL - 5-(p-CHLOROPHENYL)-5H-TETRAZOLO[5,1-a]ISOINDOLE

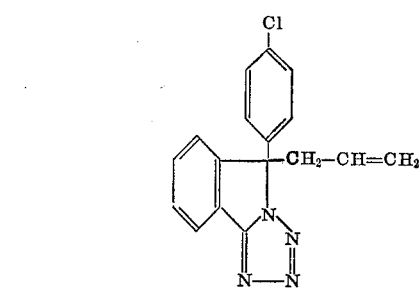

Step 1: 1-allyl-1-(p-chlorophenyl)-3-ethoxy-1H-isoindole

Under an atmosphere of nitrogen, 2.2 g. of a 60% sodium hydride dispersion in mineral oil is placed in a three liter flask. The dispersion is washed three times with anhydrous ether to remove the mineral oil and 50 ml. of absolute dimethylformamide is added. Under vigorous stirring a solution of 10.8 g. of 1-(p-chlorophenyl)-3-ethoxy-1H-isoindole in 200 ml. of absolute dimethylformamide is added dropwise and stirring is continued for 2 hours at room temperature. Allylbromide (10.8 g.) is added dropwise, the temperature rising to 50° C. Agitation is continued overnight. The solvent is removed under reduced pressure and the residue extracted with methylenechloride and washed with water. The organic layer is evaporated and the oily product, 1-allyl-1-(p-chlorophenyl)-3-ethoxy-1H-isoindole (9.7 g. (78%) is isolated.

Step 2: 3-allyl-3-(p-chlorophenyl)-isoindolin-1-one hydrazone

A mixture of 5.0 g. of 1-allyl-1-(p-chlorophenyl)-3-ethoxy-1H-isoindole and 5.0 g. of hydrazine in 50 ml. of absolute ethanol is refluxed overnight. Then the product, 3-allyl-3-(p-chlorophenyl)-isoindolin-1-one hydrazone, is precipitated by adding water, yield 4.2 g. (88%); M.P. 144–146° C.

Step 3: 5-allyl-5-(p-chlorophenyl)-5H-tetrazolo[5,1-a]isoindole

3 - allyl-3-(p-chlorophenyl)-isoindolin-1-one hydrazone (4.7 g.) is dissolved in 50 ml. of 2 N hydrochloric acid and chilled in ice. Then an aqueous solution of 2 g. sodium nitrite is added dropwise. After one hour at room temperature the product is extracted with methylene chloride. The crude product obtained after evaporation of the solvent is recrystallized from ethanol/water to yield 1.7 g. of 5-allyl-5 - (p - chlorophenyl)-5H-tetrazolo[5,1-a]isoindole, M.P. 100–102° C.

EXAMPLE 5.—5-(p-CHLOROPHENYL)-5-(2-PROPYNYL)-5H-TETRAZOLO[5,1-a]ISOINDOLE

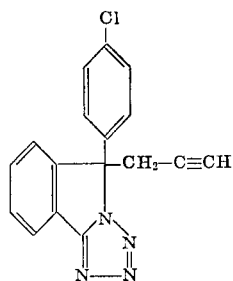

Step 1: 1-(p-chlorophenyl)-3-ethoxy-1-(2-propynyl)-1H-isoindole

Under an atmosphere of nitrogen, 4.4 g. of a 60% sodium hydride dispersion in mineral oil is placed in a three liter flask. The dispersion is washed three times with anhydrous ether to remove the mineral oil and 100 ml. of absolute dimethylformamide is added. Under vigorous stirring, a solution of 21.6 g. of 1-(p-chlorophenyl-3-ethoxy-1H-isoindole in 500 ml. of absolute dimethylformamide is added dropwise and stirring is continued for 2 hours at room temperature. Propargyl bromide (12.7 g.) is added dropwise, the temperature rising to 40° C. Agitation is continued overnight. The solvent is removed under reduced pressure and the residue extracted with ether and washed with water. The organic layer is evaporated to give the oily product 1-(p-chlorophenyl)-3-ethoxy-1-(2-propynyl)-1H-isoindole (22.5 g.).

Step 2: 3-(p-chlorophenyl)-3-(2-propynyl)-isoindolin-1-one hydrazone

A mixture of 22.5 g. of crude 1-(p-chlorophenyl)-3-ethoxy-1-(2-propynyl)-1H-isoindole and 20 g. of hydrazine in 75 ml. of absolute ethanol is refluxed overnight. The product, 3-(p-chlorophenyl)-3-(2-propynyl)-isoindolin-1-one hydrazone, is isolated after evaporating the solvent and recrystallized from methylenechloride and hexane, yield 20 g.; M.P. 154–156° C.

Step 3: 5-(p-chlorophenyl)-5-(2-propynyl)-5H-tetrazolo[5,1-a]isoindole 3-(p-chlorophenyl)-3-(2-propynyl)-isoindolin-1-one hydrazone (4 g.) is dissolved in 50 ml. of 2 N hydrochloric acid and chilled in ice. 50 ml. of methylenechloride was added. Then an aqueous solution of 2.1 g. sodium nitrite is added dropwise. After two hours at room temperature the product is extracted with methylenechloride. The crude product obtained after evaporation of the solvent is recrystallized from acetone/hexane to yield 1.2 g. of 5-(p-chlorophenyl) - 5-(2-propynyl)-5H-tetrazolo[5,1-a]isoindole, M.P. 126–127° C.

EXAMPLE 6.—5-(p - CHLOROPHENYL) - 5-ISOPROPYL-5H-TETRAZOLO[5,1-a]ISOINDOLE

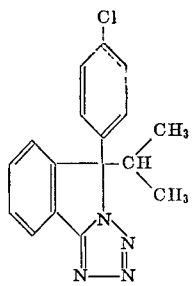

Step 1: 1-(p-chlorophenyl)-3-ethoxy-1-isopropyl-1H-isoindole

Under an atmosphere of nitrogen, 2.2 g. of a 60% sodium hydride dispersion in mineral oil is placed in a three liter flask. The dispersion is washed three times with anhydrous ether to remove the mineral oil and 50 ml. of absolute dimethylformamide is added. Under vigorous stirring a solution of 10.8 g. of 1-(p-chlorophenyl)-3-ethoxy-1H-isoindole in 200 ml. of absolute dimethylformamide is added dropwise and stirring is continued for 2 hours at room temperature. Isopropyliodide (9.2 g.) is added dropwise, the temperature rising to 50° C. Agitation is continued overnight. The solvent is removed under reduced pressure and the residue extracted with methylenechloride and washed with water. The organic layer is evaporated and the oily product 1-(p-chlorophenyl)-3-ethoxy-1-isopropyl-1H-isoindole (8.0 g.) is isolated.

Step 2: 3-(p-chlorophenyl)-3-isopropyl-isoindolin-1-one hydrazone

A mixture of 8.0 g. of 1-(p-chlorophenyl)-3-ethoxy-1-isopropyl-1H-isoindole and 8.0 g. of hydrazine in 50 ml. of absolute ethanol is refluxed overnight. Then the product, 3-(p-chlorophenyl)-3-isopropyl-isoindolin-1-one hydrazone, is precipitated by adding water, yield 5.5 g. M.P. 312–314° C.

Step 3: 5-(p-chlorophenyl)-5-isopropyl-5H-tetrazolo [5,1-a]isoindole 3-(p-chlorophenyl)-3-isopropyl-isoindolin-1-one hydrazone (2.0 g.) is dissolved in 25 ml. of 2 N hydrochloric acid and 25 ml. of methylenechloride and chilled in ice. Then an aqueous solution of 2 g. of sodium nitrite is added dropwise. After one hour at room temperature the product is extracted with methylenechloride. The crude product obtained after evaporation of the solvent is recrystallized from acetone/heptane to yield 1.5 g. of 5-(p - chlorophenyl) - 5 - isopropyl - 5H - tetrazolo[5,1 - a] isoindole, M.P. 186–187° C.

EXAMPLE 7.—5-BENZYL-5-(3,4-DIMETHOXY-PHENYL)-5H-TETRAZOLO[5,1-a]ISOINDOLE

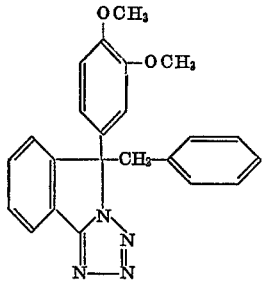

Step 1: 1-benzyl-1-(3,4-dimethoxyphenyl)-3-ethoxy-1H-isoindole

Under an atmosphere of nitrogen, 1.6 g. of a 60% sodium hydride dispersion in mineral oil is placed in a three liter flask. The dispersion is washed three times with anhydrous ether to remove the mineral oil and 50 ml. of absolute dimethylformamide is added. Under vigorous stirring a solution of 10 g. of 1-(3,4-dimethoxyphenyl)-3-ethoxy-1H-isoindole in 200 ml. of absolute dimethylformamide is added dropwise and stirring is continued for 2 hours at room temperature. Benzylchloride (4.2 g.) is added dropwise, the temperature rising to 50° C. Agitation is continued overnight. The solvent is removed under reduced pressure and the residue extracted with methylenechloride and washed with water. The organic layer is evaporated and the oily product (12 g.) 1-benzyl-1-(3,4-dimethoxyphenyl) - 3 - ethoxy - 1H - isoindole is obtained.

Step 2: 3-benzyl-3-(3,4-dimethoxyphenyl)-isoindolin-1-one hydrazone

A mixture of 9.0 g. of 1-benzyl - 1 - (3,4 - dimethoxyphenyl)-3-ethoxy-1H-isoindole and 9.5 g. of hydrazine in 50 ml. of absolute ethanol is refluxed for 2 days. After evaporation, the product, 3-benzyl - 3 - (3,4 - dimethoxyphenyl)-isoindolin-1-one hydrazone, is precipitated from methylenechloride/hexane, yield 2.5 g., M.P. 165–168° C.

Step 3: 5-benzyl-5-(3,4-dimethoxyphenyl)-5H-tetrazolo[5,1-a]isoindole 3-benzyl-3-(3,4-dimethoxyphenyl)-isoindolin - 1 - one hydrazone (8.5 g.) is dissolved in 100 ml. of 2 N hydrochloric acid and chilled in ice. Then an aqueous solution of 5 g. sodium nitrite is added dropwise. After one hour at room temperature the product is extracted with methylenechloride. The crude product obtained after evaporation of the solvent is recrystallized from ethanol to yield 2.2 g. of 5-benzyl-5-(3,4-dimethoxyphenyl) - 5H - tetrazolo[5,1-a]isoindole, M.P. 216–218° C.

What is claimed is:
1. A compound of the formula:

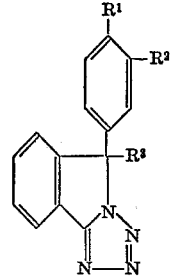

wherein $R^1$ and $R^2$ are each, independently, H, chloro, or alkoxy having 1 to 3 carbon atoms and $R^3$ is lower alkyl, benzyl, allyl or propynyl.

2. The compound of claim 1 which is 5-(p-chlorophenyl)-5-methyl-5H-tetrazolo[5,1-a]isoindole.
3. The compound of claim 1 which is 5-benzyl-5-(p-chlorophenyl)-5H-tetrazolo[5,1-a]isoindole.
4. The compound of claim 1 which is 5-benzyl-5-(3,4-dichlorophenyl)-5H-tetrazolo[5,1-a]isoindole.
5. The compound of claim 1 which is 5-allyl-5-(p-chlorophenyl)-5H-tetrazolo[5,1-a]isoindole.
6. The compound of claim 1 which is 5-(p-chlorophenyl)-5-(2-propynyl)-5H-tetrazolo[5,1-a]isoindole.
7. The compound of claim 1 which is 5-(p-chlorophenyl)-5-isopropyl-5H-tetrazolo[5,1-a]isoindole.
8. The compound of claim 1 which is 5-benzyl-5-(3,4-dimethoxyphenyl)-5H-tetrazolo[5,1-a]isoindole.

References Cited
UNITED STATES PATENTS
1,943,148   1/1934   Scheuing et al. _____ 260—308
2,913,454   11/1959  Petersen et al. _____ 260—308

ALTON D. ROLLINS, Primary Examiner

U.S. Cl. X.R.

260—326.1; 424—269, 274